(12) United States Patent
Reimer

(10) Patent No.: US 11,126,708 B2
(45) Date of Patent: Sep. 21, 2021

(54) AUTOMATIC PASSWORD RESET USING A SECURITY SYSTEM

(71) Applicant: The ADT Security Corporation, Boca Raton, FL (US)

(72) Inventor: Mark Reimer, Fort Collins, CO (US)

(73) Assignee: The ADT Security Corporation, Boca Raton, FL (US)

(*) Notice: Subject to any disclaimer, the term of this patent is extended or adjusted under 35 U.S.C. 154(b) by 196 days.

(21) Appl. No.: 15/903,487

(22) Filed: Feb. 23, 2018

(65) Prior Publication Data

US 2018/0247053 A1 Aug. 30, 2018

Related U.S. Application Data

(60) Provisional application No. 62/463,284, filed on Feb. 24, 2017.

(51) Int. Cl.

| | |
|---|---|
| *G06F 21/46* | (2013.01) |
| *H04L 9/32* | (2006.01) |
| *H04L 29/06* | (2006.01) |
| *G06F 21/31* | (2013.01) |
| *H04L 9/08* | (2006.01) |

(52) U.S. Cl.
CPC ............. *G06F 21/46* (2013.01); *G06F 21/31* (2013.01); *H04L 9/0891* (2013.01); *H04L 9/3226* (2013.01); *H04L 9/3228* (2013.01); *H04L 63/068* (2013.01); *H04L 63/083* (2013.01)

(58) Field of Classification Search
CPC .. G06F 21/31; G06F 21/48; G06F 2221/2131; H04L 9/0891; H04L 9/3228; H04L 63/068; H04L 63/0831; H04L 63/123
See application file for complete search history.

(56) References Cited

U.S. PATENT DOCUMENTS

| | | | |
|---|---|---|---|
| 10,567,962 B1* | 2/2020 | Lu | .......................... H04W 76/14 |
| 2003/0023881 A1* | 1/2003 | Fitzgibbon | ......... G07C 9/00182 726/2 |
| 2005/0007451 A1* | 1/2005 | Chiang | ............ G08B 13/19634 348/143 |

(Continued)

OTHER PUBLICATIONS

International Search Report and Written Opinion dated May 7, 2018 for International Application No. PCT/US2018/19406 filed on Feb. 23, 2018, consisting of 7-pages.

*Primary Examiner* — Ashokkumar B Patel
*Assistant Examiner* — William B Jones
(74) *Attorney, Agent, or Firm* — Christopher & Weisberg, P.A.

(57) ABSTRACT

A system and method for modification of a passcode for accessing the system are provided. The system includes a premises control unit. The premises control unit including control processing circuitry configured to: receive an expected code message, the expected code message instructing an initiation to monitor for an input from a user, receive a input code that is input by the user, determine whether the input code matches a predefined verification code, and if the input code matches the predefined verification code, cause transmission of a verification message to a monitoring server, the verification message indicating the input code matched the predefined verification code and triggering the monitoring server to allow a passcode for accessing the system to be modified.

18 Claims, 5 Drawing Sheets

(56) References Cited

U.S. PATENT DOCUMENTS

| | | |
|---|---|---|
| 2008/0117029 A1 | 5/2008 | Dohrmann et al. |
| 2008/0120703 A1 | 5/2008 | Morris et al. |
| 2013/0198822 A1 | 8/2013 | Hitchcock et al. |
| 2014/0156110 A1* | 6/2014 | Ehrman .................. G08G 1/00 701/2 |
| 2014/0156989 A1 | 6/2014 | Lalwani et al. |
| 2014/0164776 A1* | 6/2014 | Hook .................. G06F 21/6218 713/171 |
| 2015/0143408 A1* | 5/2015 | Sallas .................. H04N 21/814 725/33 |
| 2016/0285633 A1 | 9/2016 | Allinson et al. |
| 2016/0373258 A1* | 12/2016 | Bone .................. G06F 9/44505 |
| 2017/0278311 A1* | 9/2017 | Vespia .................. G07B 15/02 |
| 2018/0077648 A1* | 3/2018 | Nguyen ............... H04W 4/021 |

\* cited by examiner

AUTOMATIC PASSWORD RESET USING A SECURITY SYSTEM

CROSS-REFERENCE TO RELATED APPLICATION

This application is related to and claims priority to U.S. Provisional Patent Application Ser. No. 62/463,284, filed Feb. 24, 2017, entitled "AUTOMATIC PASSWORD RESET USING A SECURITY SYSTEM," the entirety of which is incorporated herein by reference.

TECHNICAL FIELD

This disclosure relates to premises systems, and in particular to a method and system for modifying a passcode for accessing a system.

BACKGROUND

The demand for systems that monitor homes and businesses for alarm conditions has continued to grow as more home and business owners seek to protect their premises from various hazards and threats. Examples include intrusion, fire, carbon monoxide and flooding, among others dangers that may be monitored and reported to a monitoring station. When a sensor such as a motion detector is triggered, a representative at a remote monitoring center receives an alarm event code and initiates a response process, including contacting a homeowner or others on a contact list and/or first responders such as local firefighters and/or police to request a dispatch to investigate the event at the premises being monitored. These systems further extend into the home automation field by monitoring and controlling home automation based devices in and around a premises. Examples include monitoring and/or controlling a thermostat, lighting, appliances, etc.

These systems are typically professionally monitored in which mobile and web interfaces are provided for customers to interact with their respective premises system, along with allowing customers to view/pay bills and view security alarm and other related account information. Such access is secured by a password or code known to the customer. However, when this password is lost or forgotten, the customer may be required to call or access a website that allows for automated resetting of the password. One common way to verify the customer has authority to change or reset the password is for the automated service to ask the customer three previously customer-defined questions and answers. The problem with this verification mechanism is that data has shown that the answers to these questions are forgotten nearly as often as the password, thereby leading to more frustration as the customer has no alternative but to call the monitoring service center to talk to a person in order to change the password, which is a time-consuming process.

Another method for resetting the password is to send a temporary password to the customer's known email address. The problem with this and other methods is that allowing the customer to reset their password too easily, using information that is readily accessible in social media, leads to insecure access to their security system and account information by unauthorized individuals. On the other side, while making the password reset process too cumbersome may increase security, such a process may frustrate customers as they are given no opportunity to reset their passwords on their own and are forced to call to have their passwords reset.

SUMMARY

Some embodiments advantageously provide a method and system for modifying a passcode of a premises system.

According to one embodiment of the disclosure, a system is provided. The system includes a premises control unit. The premises control unit includes control processing circuitry configured to: receive an expected code message, the expected code message instructing an initiation to monitor for an input from a user, receive a input code that is input by the user, determine whether the input code matches a predefined verification code, and if the input code matches the predefined verification code, cause transmission of a verification message to a monitoring server, the verification message indicating the input code matched the predefined verification code and triggering the monitoring server to allow a passcode for accessing the system to be modified.

According to one aspect of this embodiment, the predefined verification code is received in the expected code message. According to one aspect of this embodiment, the premises control unit further includes a memory configured to store the predefined verification code before receipt of the expected code message. According to one aspect of this embodiment, the predefined verification code is numerical code. According to one aspect of this embodiment, the predefined verification code corresponds to one of a premises arm code and premises disarm code.

According to one aspect of this embodiment, the control processing circuitry is configured to: if the input code does not match the predefined verification code, cause a premises device to display a predefined message, the predefined message indicating that the input code does not match the predefined verification code. According to one aspect of this embodiment, the system further includes a server. The server includes server processing circuitry. The server processing circuitry is configured to: receive a passcode modification request message, and in response to receiving the passcode modification request message, cause transmission of the expected code message to the premises control unit. The passcode modification request message indicates a request has been made to modify the passcode for accessing the system. According to one aspect of this embodiment, the server processing circuitry is further configured to: receive the verification message from the premises control unit, and in response to receiving the verification message: cause transmission of an acceptance message, and allow the passcode for accessing the system to be modified. The acceptance message indicates the request to modify the passcode for accessing the system has been accepted.

According to one aspect of this embodiment, the system is a premises security system. The input code that matches the predefined verification code that corresponds to a premises arm code and/or premises disarm code for the premises security system. According to one aspect of this embodiment, the processing circuitry is further configured to temporarily prevent arming and/or disarming of the premises security system in response to receiving the expected code message or temporarily disable the premises security system in response to receiving the expected code message. The received input code fails to arm and/or disarm the premises security system.

According to one embodiment of this disclosure, a method for a system is provided in which an expected code message is received. The expected code message instructs an initiation to monitor for an input from a user. An input code that is input by the user is received. A determination is made whether the input code matches a predefined verification code. If the input code matches the predefined verification code, transmission of a verification message to a monitoring server is caused. The verification message indicates the input code matched the predefined verification code and triggering the monitoring server to allow a passcode for accessing the system to be modified.

According to one aspect of this embodiment, the predefined verification code is received in the expected code message. According to one aspect of this embodiment, the predefined verification code is stored before receipt of the expected code message. According to one aspect of this embodiment, the predefined verification code is numerical code.

According to one aspect of this embodiment, the predefined verification code corresponds to one of a premises arm code and premises disarm code. According to one aspect of this embodiment, if the input code does not match the predefined verification code, a premises device is caused to display a predefined message. The predefined message indicates that the input code does not match the predefined verification code. According to one aspect of this embodiment, a passcode modification request message is received. The passcode modification request message indicates a request has been made to modify the passcode for accessing the system. In response to receiving the passcode modification request message, transmission of the expected code message is caused. According to one aspect of this embodiment, the verification message is received. In response to receiving the verification message: transmission of an acceptance message is caused, and allow the passcode for accessing the system is allowed to be modified. The acceptance message indicates the request to modify the passcode for accessing the system has been accepted.

According to one aspect of this embodiment, the system is a premises security system. The input code that matches the predefined verification code that corresponds to a premises arm code and/or premises disarm code for the premises security system. According to one aspect of this embodiment, the processing circuitry is further configured to temporarily prevent arming and/or disarming of the premises security system in response to receiving the expected code message or temporarily disable the premises security system in response to receiving the expected code message. The received input code fails to arm and/or disarm the premises security system.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
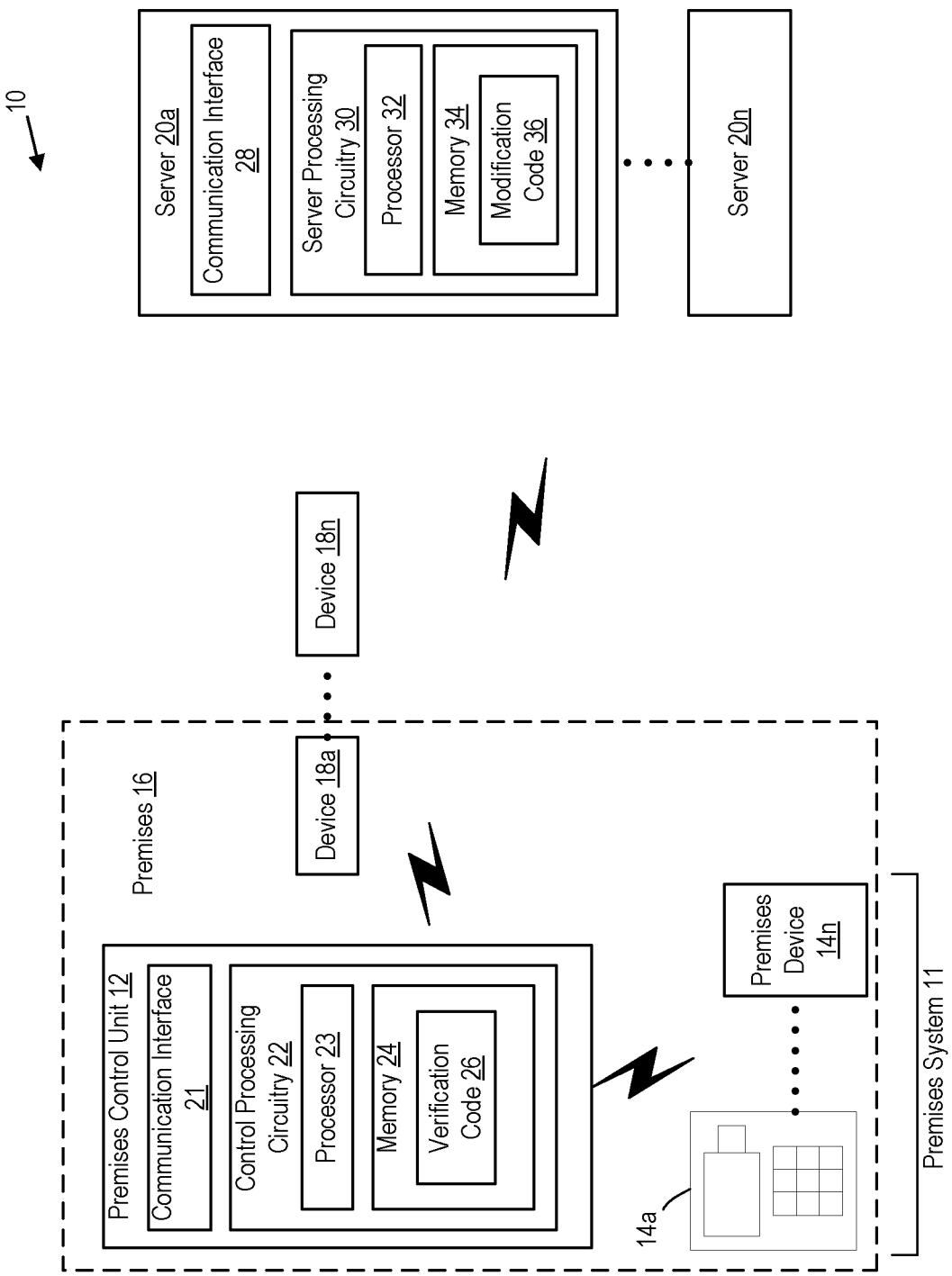
FIG. 1 an exemplary system for performing passcode reset using a premises system in accordance with the principles of the invention.

The instant disclosure advantageously recognizes that approximately 66% of customers who call a monitoring center or the automated monitoring center system to have their passcodes reset do so from their home where the premises system, i.e., premises control unit and premises devices, is installed. The instant invention advantageously incorporates the security panel of a premises system, in one or more embodiments, that is located at the premises as part of the methodology to reset the password. For example, the instant invention advantageously uses two aspects for verify user trying to reset the password: (1) the user must know something only an authorized person would likely know such as the security system PIN for arm/disarming, and (2) the user must have access to a system component that only a person who is authorized to reset the password would likely have access to such as the security panel keypad of the premises system at the premises.

Before describing in detail exemplary embodiments that are in accordance with the disclosure, it is noted that the embodiments reside primarily in combinations of system/device components and processing steps related to a system and method for resetting a passcode using a premises system. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for performing passcode reset using a premises system in accordance with the principles of the disclosure and designated generally as "10." System 10 includes premises system 11 including premises control unit 12 and premises device 14a-14n (collectively referred to as premises device 14) located in and/or proximate premises 16, in communication with each other via one or more communication protocols, links and/or channels. In one or more embodiments, premises system 11 is a premises security system. Premises device 14a-14n may include sensors, control panels, control devices, images capture devices, life safety devices, life style devices and/or other devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include digital cameras and/or video cameras, among other image capture devices that are well known in the art.

System 10 further includes one or more devices 18a-18n (collectively referred to as device 18) and one or more servers 20a-20n in communication with each other via one or more communication protocols, links and/or channels. Devices 18a-18n may include mobile device, wireless device, computer, laptop and other device capable of performing device 18 functions described herein. Premises control unit 12 includes communication interface 21 for communicating with at least one of one or more premises device 14, device 18 and server 20. In one or more embodiments, communication interface 22 includes or is replaced by transmitter circuitry and receiver circuitry for transmitting and receiving signals and/or data.

Premises control unit 12 includes control processing circuitry 22. In some embodiments, control processing circuitry 22 may include a processor 23 and memory 24, memory 24 containing instructions which, when executed by processor 23, configure processor 23 to perform the one or more functions described herein such as the process described with respect to FIG. 2. In addition to a traditional processor and memory, control processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Control processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, alarm conditions, etc. Control processing circuitry 22 may be configured to control any of the methods described herein and/or to cause such methods to be performed, e.g., by processor 23.

Corresponding instructions may be stored in memory 24, which may be readable and/or readably connected to the control processing circuitry 22. In other words, control processing circuitry 22 may include a controller, which may comprise a microprocessor and/or microcontroller and/or FPGA (Field-Programmable Gate Array) device and/or ASIC (Application Specific Integrated Circuit) device. It may be considered that control processing circuitry 22 includes or may be connected or connectable to memory, which may be configured to be accessible for reading and/or writing by the controller and/or control processing circuitry 22. Memory 24 is configured to store verification code 26 for performing the verification process described in detail with respect to FIG. 2.

In one or more embodiments, servers 20a-20n provide at least one of monitoring of premises control unit 12 and/or premises devices 14, storage (database functions) of account information associated with premises control unit 12, storage of data (database functions) associated with premises control unit 12, and other functions associated with monitoring and/or configuration of premises control unit 12 and/or premises devices 14. Server 20 includes communication interface 28 for communicating with at least one of one or more devices 18, premises control unit 12 and other devices in system 10. In one or more embodiments, communication interface 28 includes or is replaced by transmitter circuitry and receiver circuitry for transmitting and receiving signals and/or data.

Server 20 includes server processing circuitry 30. In some embodiments, the server processing circuitry 30 may include a processor 32 and memory 34. Memory 34 contains instructions which, when executed by processor 32, configure processor 32 to perform the one or more functions described herein such as the process described with respect to FIG. 3. In addition to a traditional processor and memory, server processing circuitry 30 may comprise integrated circuitry for processing and/or control, e.g., one or more processors and/or processor cores and/or FPGAs (Field Programmable Gate Array) and/or ASICs (Application Specific Integrated Circuitry).

Server processing circuitry 30 may comprise and/or be connected to and/or be configured for accessing (e.g., writing to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry, data, premises 16 account information, premises control unit 12 data and/or configuration, billing information, etc. Server processing circuitry 30 may be configured to control any of the methods described herein and/or to cause such methods to be performed, e.g., by processor 32. Corresponding instructions may be stored in the memory 34, which may be readable and/or readably connected to server processing circuitry 30. In other words, server processing circuitry 30 may include a controller, which may comprise a microprocessor and/or microcontroller and/or FPGA (Field-Programmable Gate Array) device and/or ASIC (Application Specific Integrated Circuit) device. It may be considered that server processing circuitry 30 includes or may be connected or connectable to memory, which may be configured to be accessible for reading and/or writing by the controller and/or server processing circuitry 30. Memory 34 is configured to store modification code 36 for performing the modification process described in detail with respect to FIG. 3.

Figure 2:
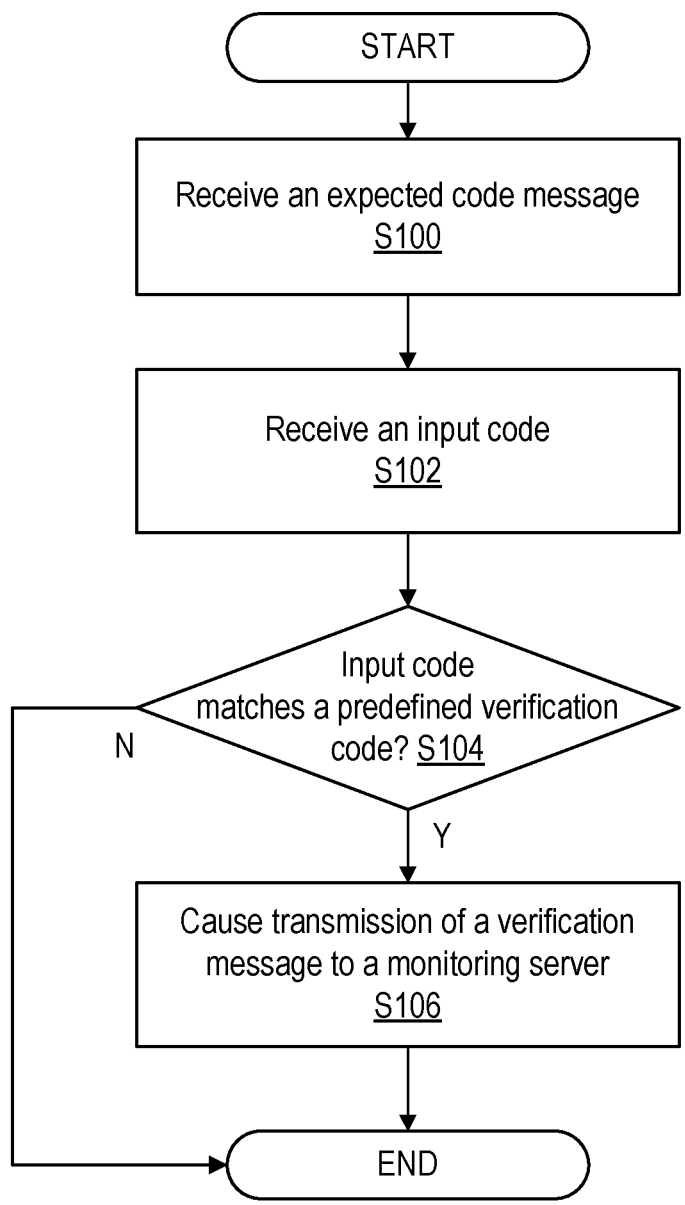
FIG. 2 is a flow diagram of an exemplary verification process of verification code in accordance with the principles of the invention.

FIG. 2 is a flow diagram of an exemplary verification process of verification code 26 in accordance with the principles of the invention. The verification process advantageously verifies that an input code matches a predefined verification code, thereby allowing a user to modify a passcode for accessing system 10. Control processing circuitry 22 receives an expected code message (Block S100). In one embodiment, control processing circuitry 22 may receive an expected code message from server 20 in which the expected code message instructs an initiation to monitor for an input, e.g., input code, to be input by a user. In one or more embodiments, the expected code message may include a predefined verification code that is used to verify that the correct input code, discussed below, has been entered. In one or more embodiments, the predefined verification code is a numerical code or alphanumeric code. In one or more embodiments, the predefined verification code may be defined or generated randomly by server 20. In one or more embodiments, the predefined verification code may be defined by a user for storage at premises control unit 12 and/or server 20. In one or more embodiments, the predefined verification code may correspond to a premises arm code and/or a premises disarm code.

Control processing circuitry 22 receives an input code that is input by the user (Block S102). For example, in one or more embodiments, the input code may be entered into premises device 14 such as a control panel with keyboard. Control processing circuitry 22 determines whether the input code matches the predefined verification code (Block S104). In one or more embodiments, the predefined verification code may be received within the expected code message. In one or more embodiments, the predefined verification code may be stored in memory 24 before receipt of the expected code message. If control processing circuitry 22 determines the input code matches the predefined verification code, control processing circuitry 22 causes transmission of a verification message to server 20 (S106). In one or more embodiments, the verification message may indicate that the input code matched the predefined verification code and may trigger server 20 to allow a passcode for accessing system 10 to be set or modified. In one or more embodiments, accessing system 10 may include accessing and/or modifying data, records, billing, account(s), etc. stored at server 20 that are linked or associated with premises control unit 12 and/or premises devices 14. In one or more embodiments, accessing system 10 may include accessing premises control unit 12 functionality and/or accessing and/or modifying data stored at premises control unit 12 via server 20 or directly via premises control unit 12.

In one or more embodiments, premises system 11 may be a premises security system where the input code that matches the predefined verification code corresponds to a premises arm code and/or premises disarm code for the premises security system. In one or more embodiments, processing circuitry 30 may be further configured to temporarily prevent arming and/or disarming of the premises security system in response to receiving the expected code message or temporarily disable the premises security system in response to receiving the expected code message, where the received input code fails to arm and/or disarm the premises security system.

If control processing circuitry 30 determines the input code does not match the predefined verification code, the verification process may end. Alternatively, the determination of Block S100 may be repeated. Alternatively, control processing circuitry 22 may cause premises device 14 to display a predefined message where the predefined message indicates that the input code does not match the predefined verification code. For example, control processing circuitry 22 may transmit a predefined message to control panel 14a such as to cause or instruct control panel 14a to display the message. In one or more embodiments, control processing circuitry 22 may transmit a predefined message to device 18 such as to cause or instruct device 18 to display the message.

Figure 3:
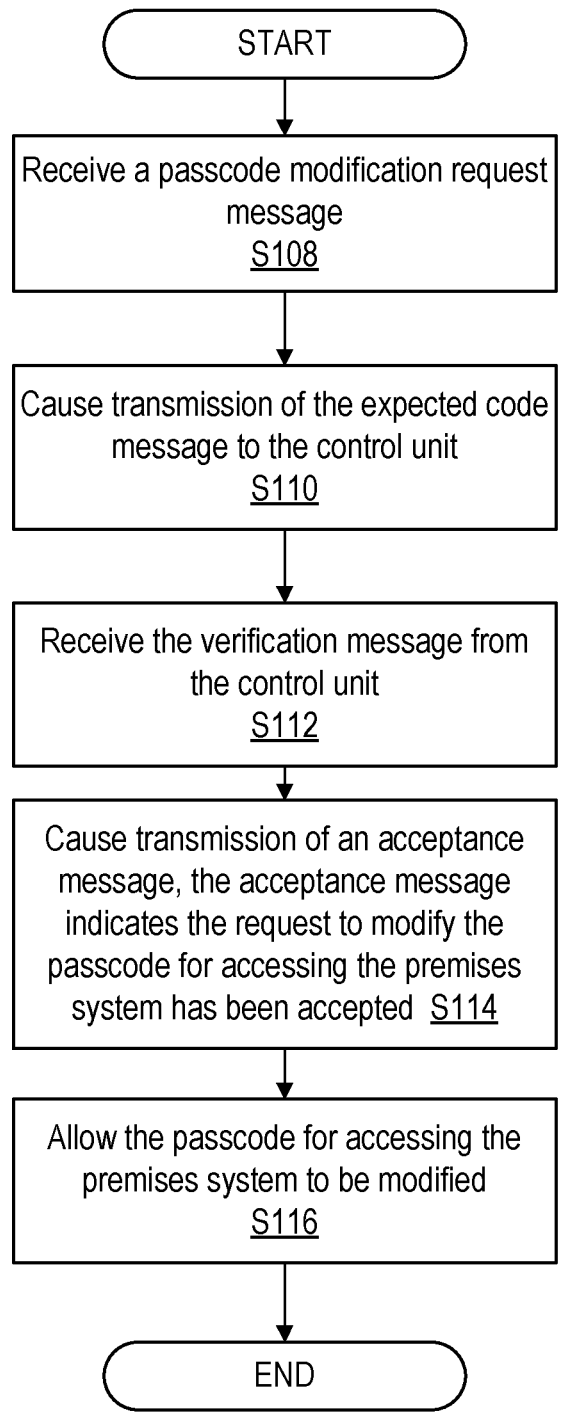
FIG. 3 is a flow diagram of an exemplary modification process of modification code in accordance with the principles of the invention.

FIG. 3 is a flow diagram of an exemplary modification process of modification code 36 in accordance with the principles of the invention from the perspective of server 20. The modification process may initiate the verification process described in FIG. 2, and also advantageously may allow for modification of the passcode for accessing premises system 11 and/or accessing system 10 based on the results of the verification process. Server processing circuitry 30 receives a passcode modification request message (Block S108). In one or more embodiments, the passcode modification request message may indicate a request has been made to modify a passcode for accessing system 10. Server processing circuitry 30 causes transmission of the expected code message to premises control unit 12 (Block S110). For example, in one or more embodiments, in response to receiving the passcode modification request message, server processing circuitry 30 may cause transmission of the expected code message to premises control unit 12.

Server processing circuitry 30 receives the verification message from premises control unit 12 (Block S112). Server processing circuitry 30 causes transmission of an acceptance message (Block S114). In one or more embodiments, the acceptance message may indicate that the passcode modification request message has been accepted. Server processing circuitry 30 allows modification of the passcode for accessing system 10 (Block S116). For example, in one or more embodiments, in response to receiving the verification message, server processing circuitry 30 may be configured to cause transmission of an acceptance message and may allow modification of the passcode for accessing system 10. In one or more embodiments, accessing system 10 may include accessing and/or modifying data, records, billing, account(s), etc. stored at server 20 that are linked or associated with premises control unit 12. In one or more embodiments, accessing system 10 may include accessing premises control unit 12 functionality and/or accessing and/or modifying data stored at premises control unit 12 via server 20 or directly via premises control unit 12.

Figure 4:
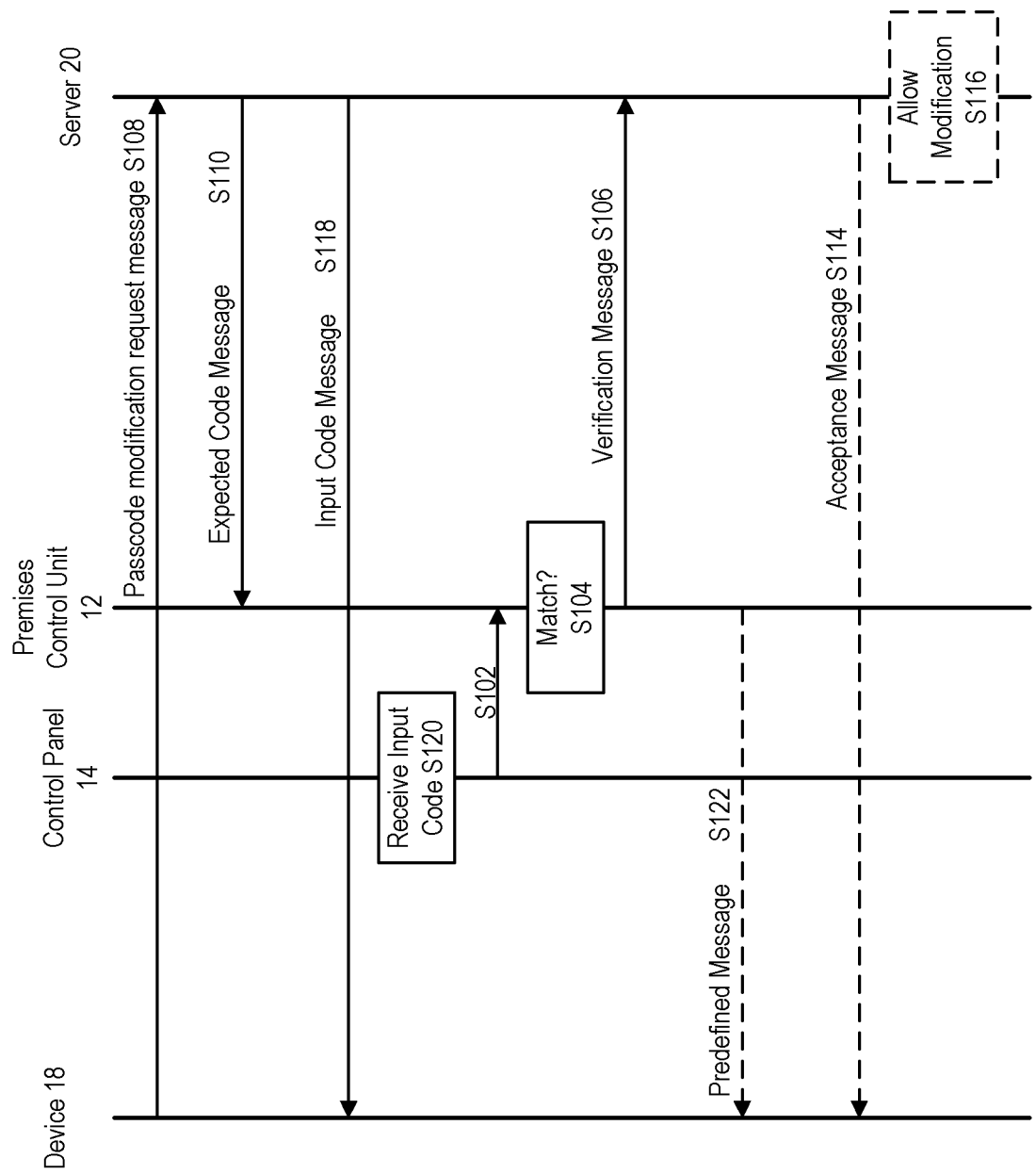
FIG. 4 is an exemplary signaling diagram of system in accordance with the principles of the invention.

FIG. 4 is an exemplary signaling diagram of system 10 in accordance with the principles of the invention. Server 20 receives a passcode modification request message from device 18 (Block S108). Server 20 transmits an expected code message to premises control unit 12 (Block S110). Server 20 transmits input code message to device 18 (Block S118). Input code message is configured to cause device 18 to indicate to the user a predefined verification code to input into a specific premises device 14 such as control panel 14a. The indication at device 18 may include at least one of an audio and visual indication of the predefined verification code. Control panel 14a determines the input code has been input into control panel 14a (Block S120). Premises control unit 12 receives the input code from control panel 14a (Block S102). Premises control unit 12 determines whether the input code matches the predefined verification code (Block S104).

Premises control unit 12 transmits verification message to server 20 if the input code matches the predefined verification code (Block S106). If the input code does not match the predefined verification code, premises control unit 12, in one or more embodiments, transmits a predefined message that causes or triggers device 18 to notify the user of device 18 to reenter the input code received in the expected code message (Block S122). In one or more embodiments, the predefined message may be transmitted to control panel 14 for display. If the input code matches the predefined verification code, server 20 may transmit an acceptance message. The acceptance message may indicate that the passcode modification request message has been accepted. Server 20 allows modification of the passcode for accessing premises system 10 such as via device 18 (S116). In one or more embodiments, accessing system 10 may include accessing and/or modifying data, records, billing, account(s), etc. stored at server 20 that are linked or associated with premises control unit 12. In one or more embodiments, accessing system 10 may include accessing premises control unit 12 functionality and/or accessing and/or modifying data stored at premises control unit 12 via server 20 or directly via premises control unit 12.

Figure 5:
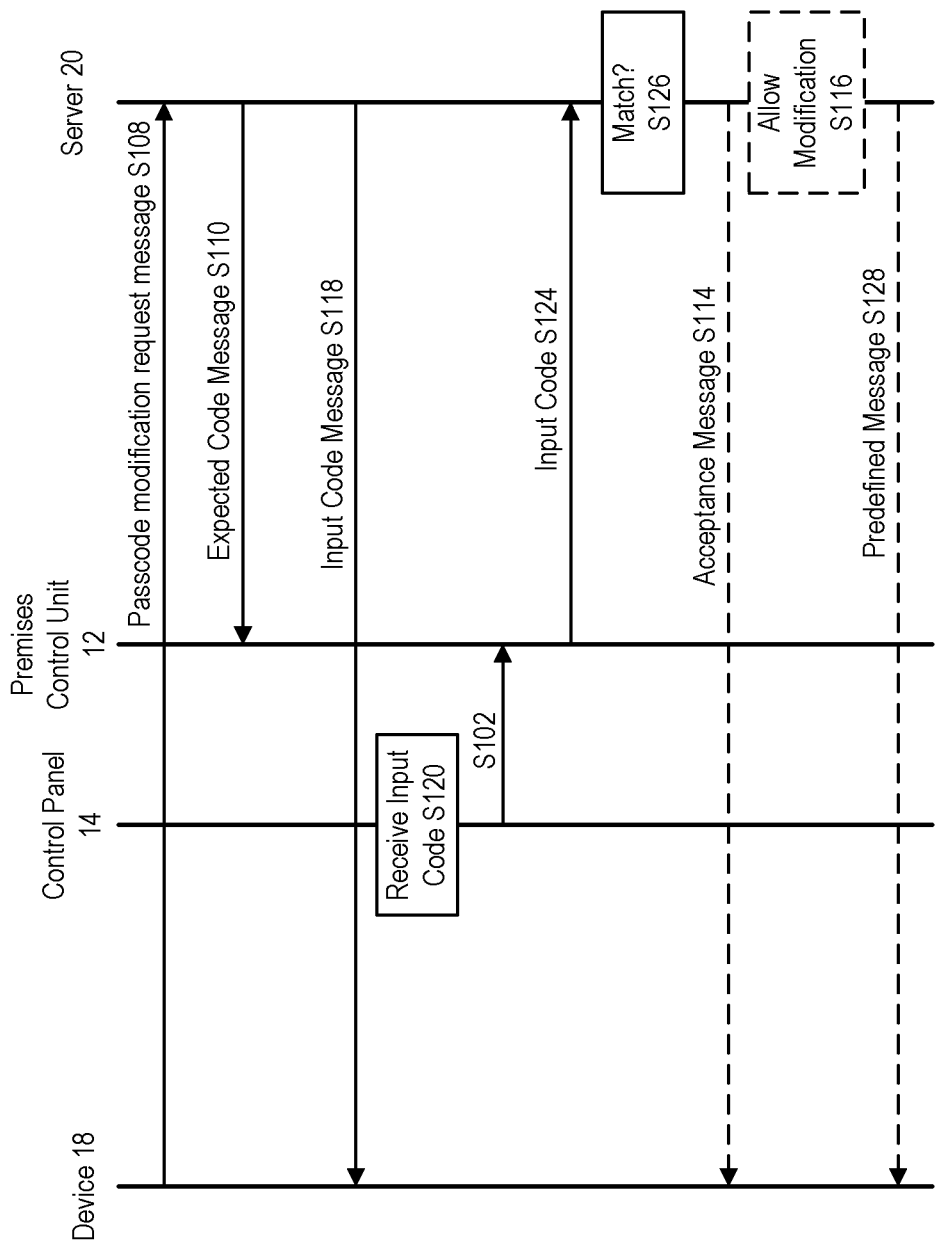
FIG. 5 is an exemplary signaling diagram of another embodiment of the system in accordance with the principles of the invention.

FIG. 5 is an exemplary signaling diagram of another embodiment of system 10 in accordance with the principles of the invention. Blocks S108, S110, S118, S120, S102, S114 and S116 are described above with respect to FIG. 4. In this embodiment, server 20 may perform the determination as to whether the input code matches the predefined verification code. For example, premises control unit 12 transmits the input code that was input by a user via control panel 14a, to server 20 (Block S124). Server 20 determines whether the input code matches the predefined verification code (Block S126). If server 20 determines the input code matches the predefined verification code, server 20 may perform blocks S114 and S116. If server 20 determines the input code does not match the predefined verification code, in one or more embodiments, server 20 transmits a predefined message that causes or triggers device 18 and/or control panel 14 to notify the user to reenter the predefined verification code received in the expect code message (Block S128). In one or more embodiments, predefined message may be transmitted to other devices capable of displaying the predefined message.

As will be appreciated by one of skill in the art, the concepts described herein may be embodied as a method, system, server and/or premises control unit. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a non-transitory tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A system for modification of a passcode for accessing the system, the system being a premises security system and comprising:
a premises control unit, the premises control unit comprising:
control processing circuitry configured to:
receive an expected code message, the expected code message instructing an initiation to monitor for an input code from a user, the expected code message including a predefined verification code that is used to verify that a correct input code from the user has been entered;
prevent arming and disarming of the premises security system for a predetermined period of time in response to receiving the expected code message;
receive the input code input by the user;
determine whether the input code matches the predefined verification code; and
if the input code matches the predefined verification code, determine that the correct input code has been entered and cause transmission of a verification message to a monitoring server, the verification message indicating the input code matched the predefined verification code and triggering the monitoring server to allow a passcode for accessing the system to be modified.

2. The system of claim 1, the premises control unit further comprising a memory, the memory configured to store the predefined verification code before receipt of the expected code message.

3. The system of claim 1, wherein the predefined verification code is numerical code.

4. The system of claim 1, wherein the predefined verification code corresponds to at least one of a premises arm code and a premises disarm code.

5. The system of claim 1, wherein the control processing circuitry is configured to:
if the input code does not match the predefined verification code, cause a premises device to display a predefined message, the predefined message indicating that the input code does not match the predefined verification code.

6. The system of claim 1, further comprising a server, the server including server processing circuitry, the server processing circuitry configured to:
receive a passcode modification request message, the passcode modification request message indicating a request has been made to modify the passcode for accessing the system; and
in response to receiving the passcode modification request message, cause transmission of the expected code message to the premises control unit.

7. The system of claim 6, wherein the server processing circuitry is further configured to:
receive the verification message from the premises control unit;
in response to receiving the verification message, cause transmission of an acceptance message, the acceptance message indicating the request to modify the passcode for accessing the system has been accepted; and
allow the passcode for accessing the system to be modified.

8. The system of claim 1, wherein
the input code that matches the predefined verification code corresponding corresponds to at least one of a premises arm code and a premises disarm code for the premises security system.

9. The system of claim 8, wherein
the received input code fails to at least one of arm and disarm the premises security system.

10. A method for a system for modification of a passcode for accessing the system, the system being a premises security system, the method comprising:
receiving an expected code message, the expected code message instructing an initiation to monitor for an input code from a user, the expected code message including a predefined verification code that is used to verify that a correct input code from the user has been entered;
preventing arming and disarming of the premises security system for a predetermined period of time in response to receiving the expected code message;
receiving the input code input by the user;
determining whether the input code matches the predefined verification code; and
if the input code matches the predefined verification code, determining that the correct input code has been entered and causing transmission of a verification message to a monitoring server, the verification message indicating the input code matched the predefined verification code and triggering the monitoring server to allow a passcode for accessing the system to be modified.

11. The method of claim 10, further comprising storing the predefined verification code before receipt of the expected code message.

12. The method of claim 10, wherein the predefined verification code is numerical code.

13. The method of claim 10, wherein the predefined verification code corresponds to one of a premises arm code and a premises disarm code.

14. The method of claim 10, further comprising:
if the input code does not match the predefined verification code, causing a premises device to display a predefined message, the predefined message indicating that the input code does not match the predefined verification code.

15. The method of claim 10, further comprising:
receiving a passcode modification request message, the passcode modification request message indicating a request has been made to modify the passcode for accessing the system;
and in response to receiving the passcode modification request message, causing transmission of the expected code message.

16. The method of claim 15, further comprising:
receiving the verification message;
in response to receiving the verification message, cause transmission of an acceptance message, the acceptance message indicating the request to modify the passcode for accessing the system has been accepted; and
allow the passcode for accessing the system to be modified.

17. The method of claim 10, wherein
the input code that matches the predefined verification code corresponds to one of a premises arm code and a premises disarm code for the premises security system.

18. The method of claim 17, further comprising:
wherein the received the input code fails to at least one of arm and disarm the premises security system.

* * * * *